April 13, 1926. Re. 16,317

T. G. MARTIN

TWO-WIRE AUTOMATIC TELEPHONE SYSTEM

Original Filed March 21, 1908 5 Sheets-Sheet 1

Inventor
Talbot G. Martin.
C. H. Sales. Atty:

April 13, 1926. Re. 16,317

T. G. MARTIN

TWO-WIRE AUTOMATIC TELEPHONE SYSTEM

Original Filed March 21, 1908 5 Sheets-Sheet 2

Inventor:
Talbot G. Martin.
E. D. Yates.
Atty.

April 13, 1926. Re. 16,317
T. G. MARTIN
TWO-WIRE AUTOMATIC TELEPHONE SYSTEM
Original Filed March 21, 1908 5 Sheets-Sheet 3
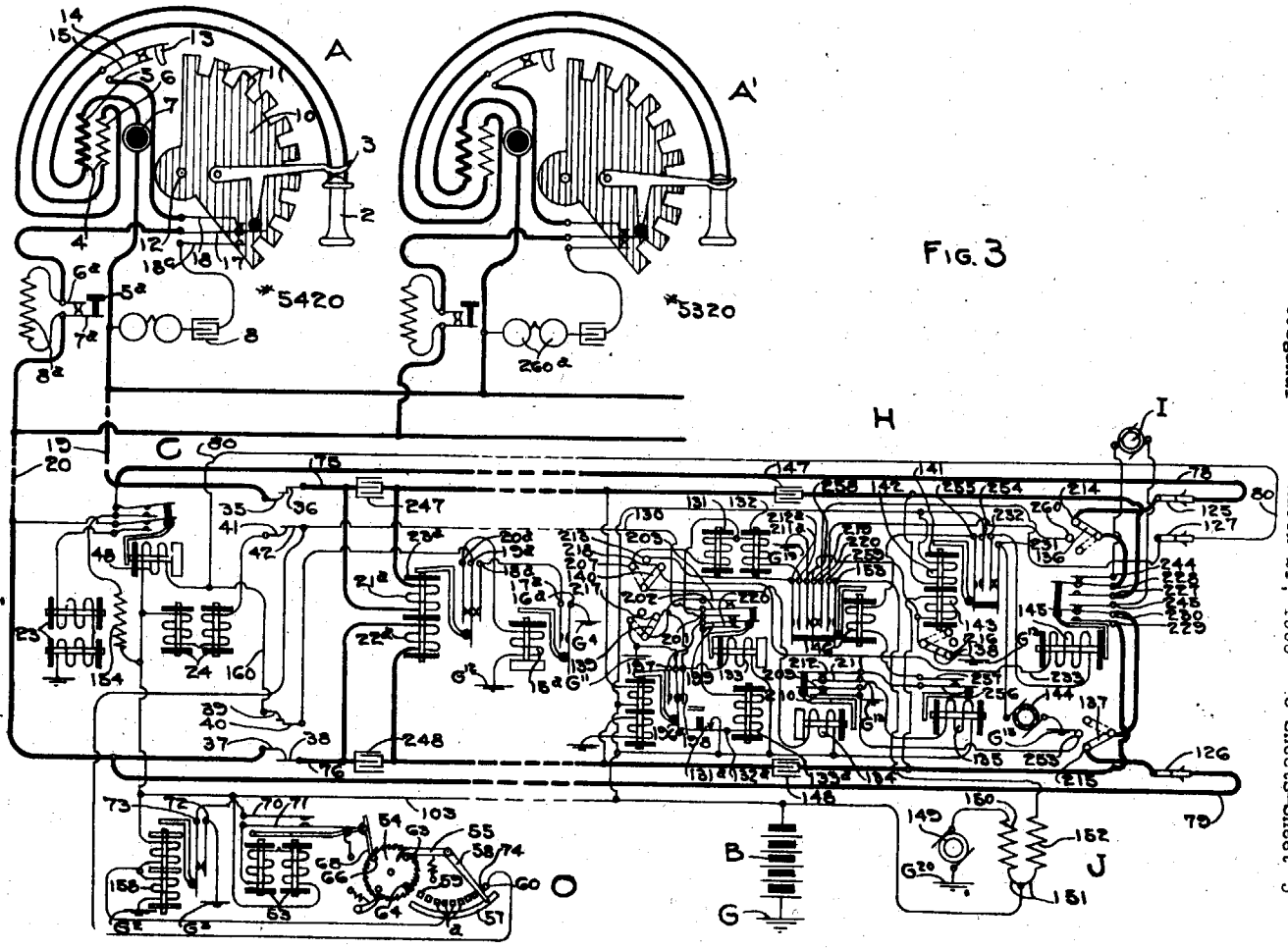
Inventor
Talbot G. Martin.
E. H. Sales Atty.

April 13, 1926. Re. 16,317
T. G. MARTIN
TWO-WIRE AUTOMATIC TELEPHONE SYSTEM
Original Filed March 21, 1908 5 Sheets-Sheet 4
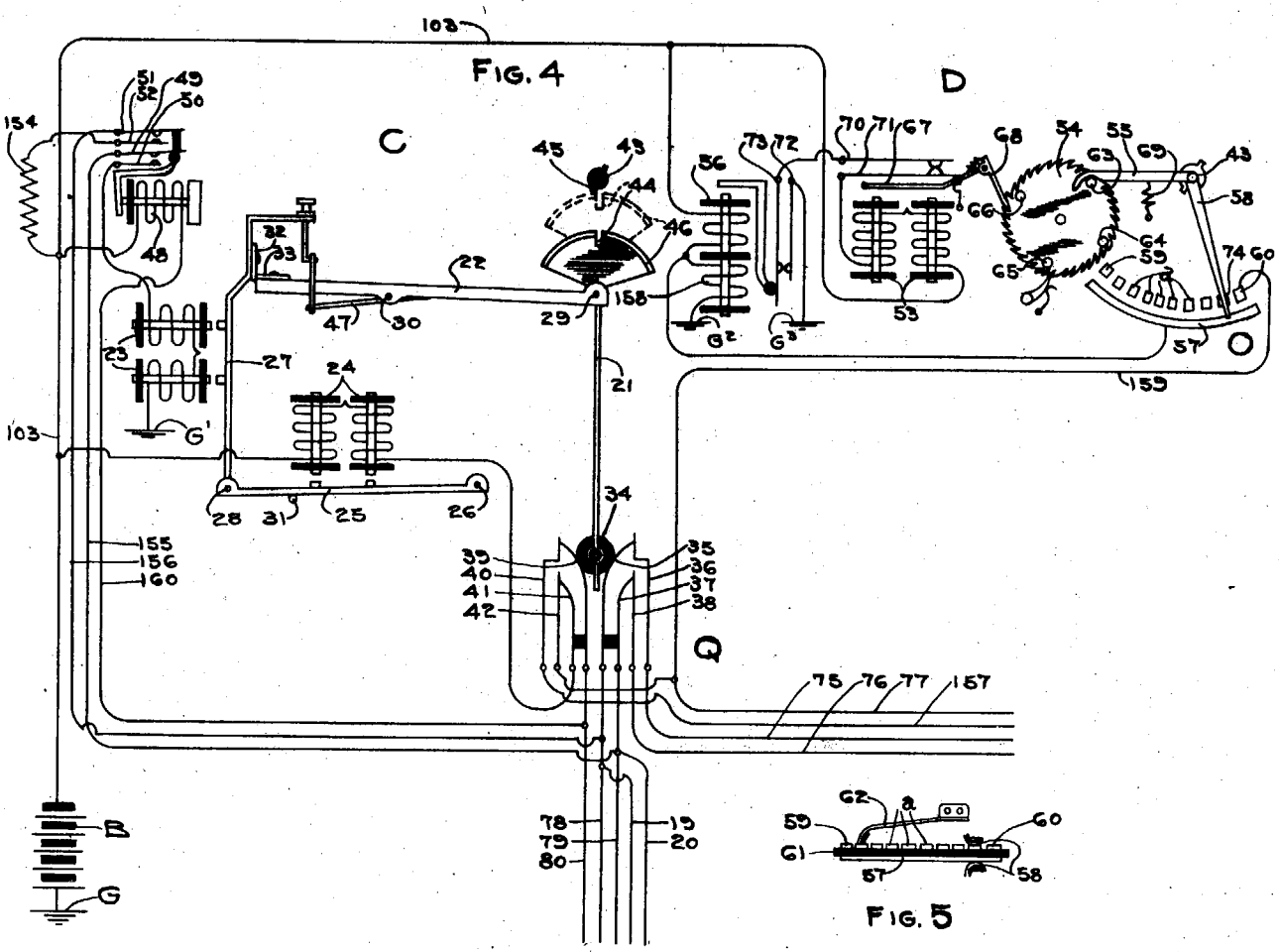
Inventor
Talbot G. Martin.
E. D. Hales Atty:

April 13, 1926. Re. 16,317

T. G. MARTIN

TWO-WIRE AUTOMATIC TELEPHONE SYSTEM

Original Filed March 21, 1908 5 Sheets-Sheet 5

Inventor
Talbot G. Martin.
E. D. Tales Atty.

Reissued Apr. 13, 1926.

Re. 16,317

UNITED STATES PATENT OFFICE.

TALBOT G. MARTIN, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

TWO-WIRE AUTOMATIC TELEPHONE SYSTEM.

Original application filed March 21, 1908, Serial No. 422,462. Renewed April 12, 1917, Serial No. 161,680. Original No. 1,249,159, dated December 4, 1917. Application for reissue filed August 30, 1918. Serial No. 252,018.

*To all whom it may concern:*

Be it known that I, TALBOT G. MARTIN, a citizen of the United States of America, and resident of Chicago, Cook County, Illinois, have invented a certain new and useful Improvement in Two-Wire Automatic Telephone Systems, of which the following is a specification.

My invention relates to telephone systems in general, but more particularly to automatic or semi-automatic telephone exchange systems, and especially to systems in which the subscribers' lines are free from operating grounds outside of the exchange or central station, these being ordinarily known as two-wire systems.

Objects of my invention are to provide a two-wire system in which automatic party-line service can be given the subscribers thereof; to provide a two-wire automatic telephone exchange system in which subscribers on the same line signal each other by means of push-buttons at their respective stations, while a called subscriber on another line is signaled automatically from the exchange or central station; to provide a two-wire automatic telephone exchange system in which the connectors will lock on busy called lines, without closing the calling line in connection therewith, the calling subscriber being at the same time given a busy signal; to provide a two-wire automatic telephone exchange system in which provision is made for enabling a party-line subscriber to call back on his own line, in order to establish telephonic communication with another subscriber on the same line; and to provide certain novel details and features of improvement and combinations tending to increase the general efficiency and serviceability of a telephone exchange system of this particular character.

To the foregoing and other useful ends my invention consists in matters hereinafter set forth and claimed.

In the accompanying drawings, Figure 1 is a diagrammatic representation of party-line equipment embodying the principles of my invention. The substations A and $A^1$ are allotted to a common line which terminates at the central office in the line switch C. At D is represented the master switch for controlling the line switches of the group of which the switch C is a member. E represents diagrammatically a first-selector switch.

Fig. 2 represents diagrammatically the central office second-selector switch F and the connector switch H. At $C^1$ is shown a line switch allotted to the party-line of which substations $A^2$ and $A^3$ are members. A central battery B having its positive terminal preferably grounded at G provides battery current for talking and operating purposes.

Fig. 3 shows how a subscriber may operate central office switches to call back and signal a subscriber on his own line.

Fig. 4 represents more fully the line switch C and the controlling master switch D.

Fig. 5 is a detail view of the master switch bank O.

Figure 1:
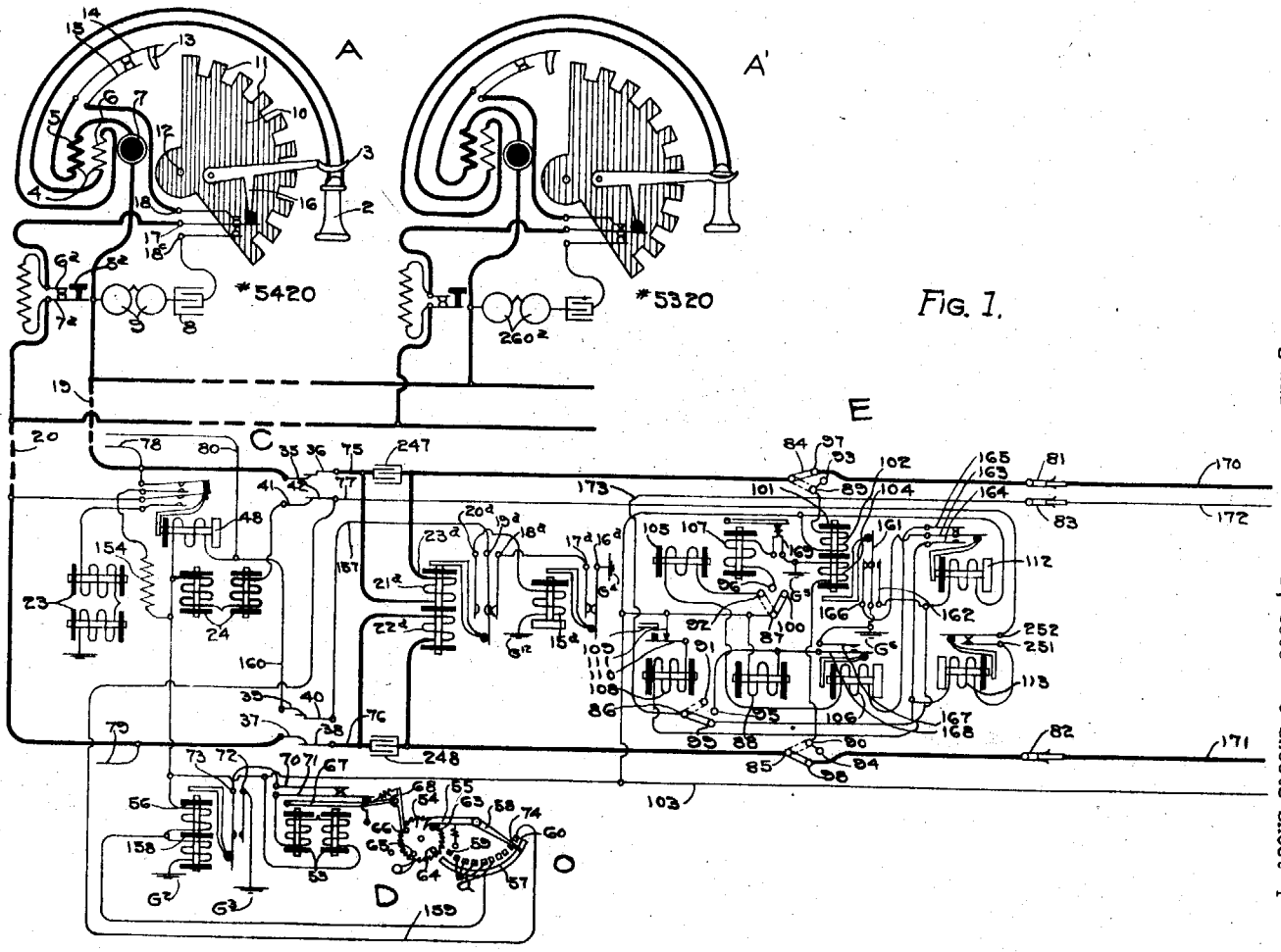

In this system each subscriber's line is, of course, provided with a line switch similar to the line switch C, and usually one-hundred of these form a group. Also, to each such group there is allotted a group of first-selector switches in common. The first-selector switches may in turn be operated to first select any one of a number of groups of second-selectors, and then some one of the selected group which may be idle. The second-selector switches may in turn be operated to first select any one of a number of groups of connector switches, and then some one of the connectors of the selected group which may be idle. Each group of connector-switches is also arranged to take care of one-hundred subscribers—that is, if any subscriber in the system wants to call another subscriber he must, through the medium of the first selector and second-selector switches, pick out a certain group of connectors, any one of the connectors of which group is capable of establishing the final connection with the desired subscriber in a particular hundred.

The substations may be of any suitable or approved type. As shown, it will be seen that substation A is somewhat different from the usual automatic substation, said substation A being arranged and modified to operate in connection with a two-wire system—that is, with a system in which no ground connection is used at the subscriber's substation. Substation A, for example, comprises the usual receiver 2, switch-hook 3, induction coil 4 which consists of the primary winding 5 and secondary winding 6, transmitter 7, condenser 8, ringer 9 and impulse wheel 10 which has the usual impulse teeth 11. The impulse wheel 10 is secured to the shaft 12, to which shaft there is also secured the dial (not shown). When the dial is turned, the impulse teeth 11 are adapted to engage the cam 13 upon the end of the spring 14 and thereby carry the latter out of engagement with the spring 15. Upon the switch-hook 3 is secured the cam 16 which, when the switch-hook is up, permits the springs 17 and 18 to engage, thereby bridging across the subscriber's line conductors 19 and 20 the primary circuit including the transmitter 7 in series with the primary winding 5; but when the switch-hook is lowered the spring 17 is carried out of engagement with the spring 18 and into engagement with the spring $18^c$, whereby the ringer 9 in series with the condenser 8 is bridged across the line conductors 19 and 20 instead. Furthermore, the substation A is provided with a signaling button $5^a$ which, when pressed, disengages the springs $6^a$ and $7^a$, whereby the short-circuit or shunt around the resistance coil $8^a$ is removed.

The line switch C (Fig. 4) comprises a plunger 21, plunger arm 22, trip magnet 23, and switch-release magnet 24, all of which are assembled upon a suitable base or frame (not shown). The said switch-release magnet is provided with an armature 25 that is pivoted on a pin 26 which rises from the base of the switch. The said armature carries pivotally secured on its end a second armature 27 that is controlled by the trip magnet 23. The pin 28 about which the armature 27 moves is carried on the end of the armature 25. The plunger 21 is pivotally secured by the pin 29 to the plunger arm 22, which latter is in turn pivoted by a pin 30 that rises from the switch frame (not shown). The lug 31 may be stamped from the frame and is provided as a stop for the armature 25. Upon the armature 27 is secured the member 32 which is adapted to normally engage the end 33 of the plunger arm 22. Furthermore, the said line switch is provided with a bank of terminals, usually ten in number, but only one of which is shown at Q (Fig. 4). The said terminal Q is shown turned from its true position with respect to the swing of the plunger 21, and the bushing 34 is correspondingly turned, all for the purpose of making the illustration clearer. The terminal Q comprises the springs 35 and 36, 37 and 38, 39 and 40, and 41 and 42. These springs are normally disconnected from each other, but are driven into contact, as shown in the drawings, when the plunger 21 engages the bank terminal Q. When the plunger 21 disengages from the bank terminal Q, the said plunger may take one of two positions relative to the plunger shaft 43—that is, the plunger may return to either locked or sliding engagement with the shaft 43. When the plunger 21 is in locked engagement with the plunger shaft 43, the notch 44 is in engagement with the flange or web 45 of the shaft 43; and when in sliding engagement the fan-like tail-piece 46 rests in the position shown by the dotted lines in Fig. 4—that is, when the plunger shaft is operated the plunger 21 is not carried along with the locked plungers, but remains in the dotted position, the plunger shaft sliding upon the edge of the tail-piece 46. The general operation of the switch is as follows: The trip magnet 23 is energized when the receiver is removed from the switch-hook and the armature 27 is attracted against the magnet cores. When the armature 27 is attracted the catch 32 slides out of contact with the end 33 of the plunger arm 22, and the said plunger arm 22, owing to the tension of the spring 47, moves about the pin 30 and thrusts the plunger 21 into the bank terminal Q; and when the trip magnet again deenergizes, the trip armature 27 falls against the end 33 of the plunger arm 22, as shown. Furthermore, when the line switch operates, and the plunger 21 is thrust onto the bank terminal Q, the shaft 43 is advanced one step, as will be explained, to carry the locked plungers opposite the next idle trunk-line. The switch is restored by the release magnet 24, on whose energization the armature 25 is attracted, and accordingly the trip armature 27 is moved upwardly until the catch 32 slides over the end 33; then when the release magnet 24 becomes deenergized the armature 25 returns to normal position and remains at rest against the stop 31. Furthermore, since the plunger arm 22 is now in engagement with the catch 32 of the armature 27, the said plunger arm is also moved about the pin 30, whereby the plunger 21 is moved from the terminal Q. Also, since the plunger shaft has advanced one step, the tail-piece 46 of the plunger 21 comes to rest in the position shown by the dotted lines, in sliding engagement with the plunger shaft 43; and as the said plunger shaft advances each time an idle trunk is seized, the plunger 21 is not advanced, but remains in this position opposite the trunk terminal from which it has last disengaged, since the slot 44 is not in engagement with the plunger shaft web 45. After all the trunk-lines have been successively seized, the shaft 43 then passes from its last position and moves toward starting point, picking up the plunger 21 when the web of the said shaft over which the slot 44 normally rides arrives at the position in which the plunger 21 was originally released—that is, the plunger passes into locked engagement with the shaft when the slot 44 slips over the web of said shaft. From thence on the plunger 21 is carried in locked engagement by the shaft 43 until it is again plunged in when another call is made. But if after the plunger is released, and before the shaft 43 returns to pick up said plunger, the switch C is again operated, the plunger 21 again engages the same terminal Q. The bridge-cut-off relay 48 is provided for controlling the springs 49, 50, 51 and 52, and, upon energizing, operates to shift the springs 49 and 51 out of engagement with the springs 50 and 52. When the springs are thus operated the line switch C is disconnected from the substation line conductors.

The master switch D, which may be of any suitable or approved type, is provided for operating the plunger shaft 43 and for controlling certain circuits that will be disclosed hereinafter. It comprises the following details: A motor magnet 53 for operating the ratchet wheel 54, which latter is designed for operating the plunger shaft 43 through the medium of the cam 55, and a differential relay 56 for controlling the energizing circuit of the motor magnet 53. The said master switch also has a bank O comprising a plurality of individual contact segments *a* and a common metallic segment 57, as shown in Fig. 4. The wiper 58 is adapted to remain in constant engagement with the bank O, and to at all times, except when the wiper is passing from the extreme left contact 59 to the extreme right contact 60, maintain some one of the segments *a* in electrical connection with the common segment 57. As shown in Fig. 5 the individual segments *a* are separated from the common segment 57 by the insulating strip 61. The spring 62 is provided so that when the wiper is carried to the contact 60 on the extreme right, the upper part of the wiper 58 slides on the guide spring 62, thus preventing the wiper from placing any of the individual segments *a* in contact with the common segment 57, whereby some interference might be caused with the master switch. The wiper 58 is operated in a step-by-step manner by the ratchet wheel 54, through the medium of the cam member 55 rigidly secured to the said wiper 58, and is adapted to successively engage the pins 63, 64, 65 and 66 upon the said ratchet wheel 54. The motor magnet 53 is provided with an armature 67 upon the end of which there is suitably secured a pawl 68. Each time that the said magnet is energized, the armature 67 is attracted against the magnet cores, and the pawl 68 engages a tooth on the ratchet wheel 54 thereby advancing the latter one step. It will be seen, therefore, that as the ratchet wheel 54 advances, the wiper 58 advances step by step from right to left; and when the pin 63, for instance, clears the cam 55, the retracting spring 69 then restores the wiper 58 to its first position at the right of the bank and in engagement with the first segment 60. The said motor magnet is provided with a couple of interrupter springs 70 and 71 that are included in the energizing circuit of the said motor magnet, which energizing circuit also comprises the springs 72 and 73 controlled by the differential relay 56. Therefore, whenever the differential relay is energized the springs 72 and 73 are pressed into contact, and the motor magnet 53 operates step by step as long as the differential relay 56 remains energized. Furthermore, it is assumed that the terminal Q of the line switch C is the first terminal of the line switch bank. While in normal locking engagement with the shaft 43, the plunger 21 is retained in front of said terminal by the plunger shaft 43, whenever the master switch wiper 58 is in engagement with the bank segment 60; but as the motor magnet 53 advances the wiper 58 onto the second segment 74, the said plunger and all idle plungers similarly engaging the shaft 43 are carried opposite the next terminal of the line switch bank. It should be noted that in each line switch bank all of the springs 35 are permanently connected and may be made of one common piece. The springs 36, however, are individual—that is, there is one separate and distinct spring for every bank set Q, there being ten in the bank. The springs 37, 39 and 41, like the springs 35, are all common, and the springs 38, 40 and 42, like the springs 36, are individual. For every bank terminal Q there is a trunk-line of three conductors 75, 76 and 77 leading to a selector; and there is also a normal trunk-line comprising the conductors 78, 79 and 80 leading to the connector banks. The subscriber's line conductors 19 and 20 terminate in the springs 35 and 37 which, as has been stated, are common springs. When the subscriber operates the line switch C, and the plunger 21 engages the terminal Q, the subscriber's line conductors 19 and 20 are extended to the vertical and rotary trunk conductors 75 and 76, thence through the windings $21^a$ and $22^a$ of the relay $23^a$ (as shown in Fig. 1) to the first-selector switch E.

The first-selector switch shown at E is of the general type described in United States Letters Patent No. 815,321, granted March 13, 1906, to Keith, Erickson & Erickson, and, as shown, is modified to adapt it to operate in connection with a two-wire system. It embodies among other details the following features: The switch shaft (not shown) carries the negative and positive line wipers 81 and 82, and the private wiper 83. The side switch is well known and comprises the side switch wipers 84, 85, 86 and 87 which may be designated as the vertical, rotary and private side switch wipers, and the rotary magnet wiper, respectively. The side switch is under the control of the private magnet 88, and when the side switch is in normal or first position the wipers 84, 85, 86 and 87 occupy the contact points 89, 90, 91 and 92, respectively. In the second position the wipers rest on the contact points 93, 94, 95 and 96, respectively; and when in third position the contact points 97, 98, 99 and 100 are engaged by their respective wipers. The windings of the usual vertical and rotary line relays are, in this case, combined into one double-wound relay 101 comprising the winding 102 which is connected with the battery lead 103, and also with the vertical trunk-line conductor, when the side switch wiper 84 is in first or second position. The second winding 104 is connected to ground, and also to the rotary trunk-line conductor, when the side switch wiper 85 is in first or second position. Through the medium of this double-wound relay, and while the side switch is in first position, the subscriber controls the vertical magnet 105 which operates to raise the switch shaft and wipers 81, 82 and 83 vertically. This line relay 101 also controls the private magnet relay 106, which latter in turn controls the private magnet 88. As usual, the private magnet controls the side switch. While the side switch in in second position the rotary magnet 107, which operates to carry the switch shaft and wipers 81, 82 and 83 in a rotary direction, is energized. The release magnet 108 provides means for restoring the selector switch to normal position. Upon the switch shaft which carries the wipers 81, 82 and 83 there is mounted the arm 109 which, when the shaft is raised one or more steps, permits the spring 110 to engage the contact point 111, whereby the release magnet 108 is connected to the battery lead. The release relay 112 is provided for closing the energizing circuit of the release magnet 108 after the switch is operated. The back-release relay 113 is provided for opening the energizing circuit through the release magnet 24 of the line switch. The relays 106, 112 and 113 are slow-acting relays—that is, they are so provided with a copper shield that when energized and the energizing circuit then broken, the said relays remain in an operated position for a moment or so. In other words, they do not instantly return to normal position after the energizing circuit is broken.

The second-selector F (Fig. 2) is similar to the first-selector E, and is provided with the usual double-wound line relay 114 having the windings 115 and 116 connected with the vertical and rotary side switch wipers 117 and 118 in the same manner in which the windings of the relay 101 of the selector switch E are connected with their vertical and rotary side switch wipers. Since like parts are similarly represented, the rotary magnet 119 and the vertical magnet 120 will be recognized and understood. The release magnet 121 is operated in the same manner in connection with the switch F that the release magnet 108 is operated in connection with the switch E. The private magnet 122 is controlled by the private magnet relay 123. The release relay 124 of the second-selector switch F performs the same function in connection with this switch that the release relay 112 and the back-release relay 113 perform in connection with the first-selector switch E—that is, the springs controlled by the relays 112 and 113 are so arranged in the second-selector switch F that they are controlled by the one relay 124. In the switch F the relays 123 and 124 are so arranged that they deenergize slowly, the same as the relays 106, 112 and 113 of the selector switch E.

The connector switch H is a modified form of the connector switch disclosed in United States Letters Patent No. 815,176 granted March 13, 1906, to Keith, Erickson & Erickson. The connector switch shaft (not shown), like the switch shaft of the selector, carries the line wipers 125 and 126 and a private wiper 127. The connector switch is also controlled by the calling subscriber though the medium of a double-wound line relay 128. The line relay 128 is provided with the windings 129 and 130. One terminal of the winding 129 is connected to the battery lead, while the other terminal is connected with the vertical trunk-line conductor. The winding 130 is connected with ground and also with the rotary trunk-line conductor. This line relay 128 directly controls the vertical magnet 131. The purpose of the vertical magnet 131 is to give the shaft and shaft wipers a vertical motion, and the rotary magnet 132 imparts to the shaft and shaft wipers a rotary or circular motion. The connector switch is also provided with the slow-acting release relay 133 which is the same as the release relay 124 of the second-selector switch. As usual, the private magnet relay 134 controls the private magnet 135, which latter controls the side switch wipers 136, 137, 138, 139 and 140. The back-bridge relay 141, comprising the windings 142 and 143, provides the means whereby the called subscriber is furnished with battery current for talking purposes. As here shown, my connector switch is of the automatic ringing type—that is, a signaling of the called subscriber is not dependent upon the calling subscriber pressing a signaling button when he calls a line not his own; for as soon as connection is established with the desired line the interrupter 144 intermittently closes an energizing circuit through the ringer relay 145, whereby the terminals of the ringer generator I are intermittenly bridged across the normal conductors of the called line. The relay 146 is so arranged that if a busy line is called the connector side switch is locked in second position, and the calling subscriber is given the busy-signal. The means whereby the connector switch may be restored to normal position is provided by the usual release magnet 133ᵃ which, when the connector switch shaft is raised one or more steps, is connected to the battery lead through the normal springs 131ᵃ and 132ᵃ. By means of the condensers 147 and 148 the circuit through the connector switch is divided into two sections. The busy-signaling apparatus J comprises the interrupter 149 in series with the winding 150 of the induction-coil 151. The winding 152 is connected with the spring 153, and when the relay 146 energizes, as will be explained, the busy-signaling apparatus is connected with the connector or side switch wiper 136.

Figure 2:
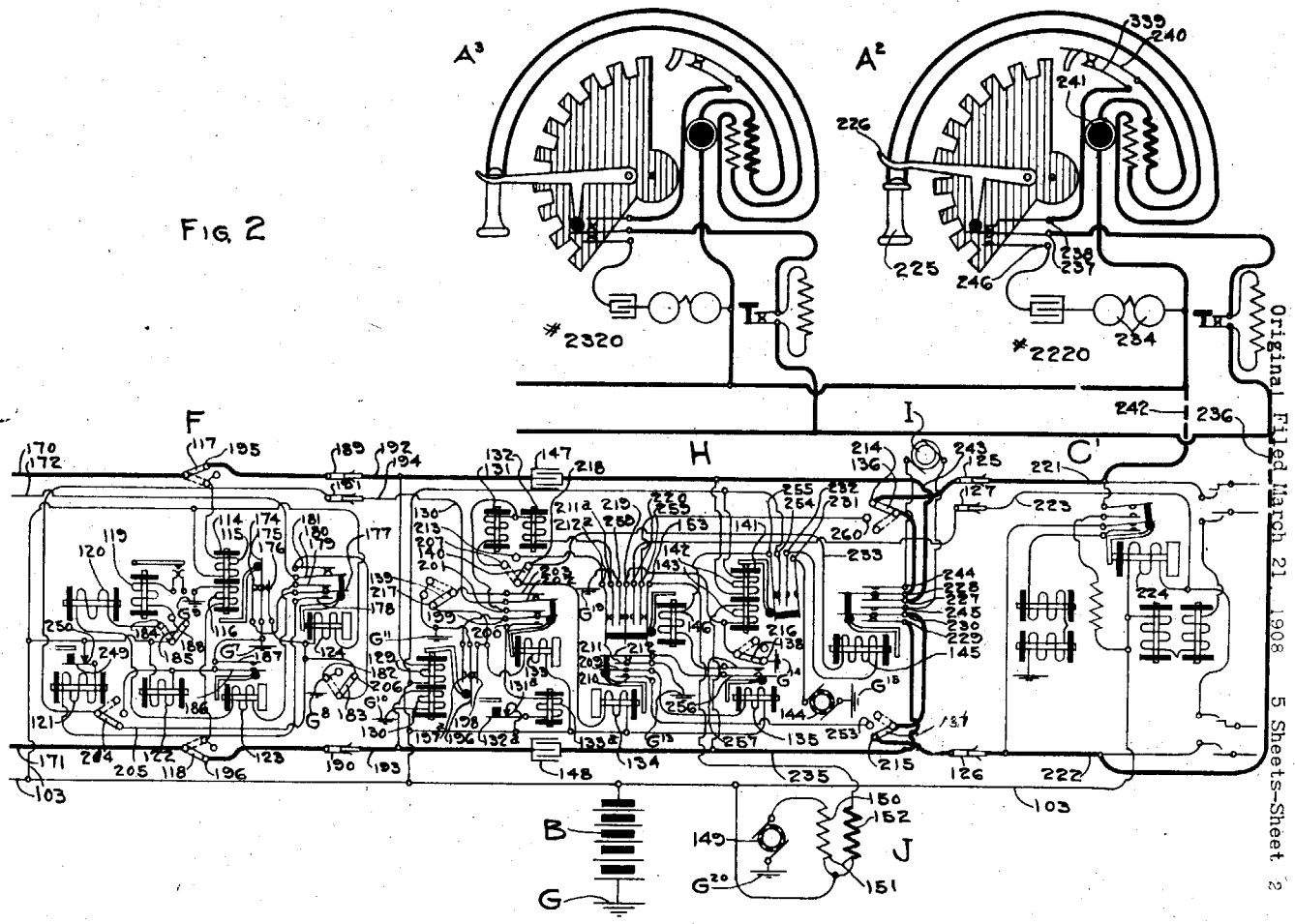

The operation of the system may be more clearly understood from an explanation of its operation in establishing a connection. It will be assumed that the subscriber at substation A wishes to call the subscriber at substation A², to which latter is allotted the number 2220. To call the number 2220 (substation A², Fig. 2) the subscriber at substation A (Fig. 1) removes his receiver from the switch-hook, and operates the calling device for each digit, in the well-known manner—that is, when the receiver is removed from the switch-hook a preliminary impulse provides an energizing circuit for the trip magnet 23 of the line switch C, whereby the line switch C is operated to seize an idle and waiting or preselected trunk-line leading to a first-selector switch. The dial is turned for the first digit, and upon returning to normal position operates the first-selector switch to establish connection with an idle trunk-line leading to a second-selector switch. In a similar manner the dial, upon returning to normal position for the second digit, operates the second-selector switch F to establish connection with an idle trunk-line leading to a connector switch. The impulses delivered by the dial for the last two digits are directed toward the connector H, which latter operates to place the shaft wipers in connection with the contacts corresponding to the desired subscriber. The preliminary impulse for energizing the trip magnet 23 occurs when the receiver 2 is removed from the switch-hook 3 and the cam-arm 16 permits the spring 17 to engage the spring 18, thereby removing the ringer from across the line and bringing the primary circuit instead. When the primary circuit is thus bridged across the line, the energizing circuit for the trip magnet 23 is completed and extends from ground G′ (Fig. 4) through the trip magnet 23, through the springs 50 and 49, conductor 155 to the rotary line conductor 20 (Fig. 1), resistance coil 8ᵃ and springs 6ᵃ and 7ᵃ in multiple, through the springs 17 and 18, impulse springs 15 and 14, primary winding 5, transmitter 7 to the vertical line conductor 19, thence through the conductor 156 (Fig. 4), springs 51 and 52, through the resistance coil 154 to the battery lead 103, thence through battery B to ground G. As soon as the trip magnet 23 energizes, the armature 27 is attracted and the plunger 21 is liberated and thrust into the bank terminal Q by the spring 47, assuming that the plunger 21 is opposite the terminal Q at the time. When the plunger 21 engages the bank terminal Q, an energizing circuit is established through the motor magnet relay 56, which in turn operates to close an energizing circuit through the motor magnet 53 of the master switch D. The motor magnet then operates to advance all idle plungers that are in locking engagement with the shaft 43 opposite the next idle bank terminal similar to the terminal Q. The circuit through the relay 56 extends from ground G² through the winding 158 of the relay 56 to the common segment 57, thence through the wiper 58, through the contact 60, conductor 159, bank terminal springs 42 and 41, through the winding of the release magnet 24 to the battery lead 103, thence through battery B to ground G. Although this circuit includes the release magnet 24, the said magnet does not operatively energize, since the winding of the relay 56 is of a high resistance, while the winding of the release magnet 24 is comparatively low. The relay 56, upon energizing, operates to place the springs 72 and 73 in contact, whereby a circuit is completed through the motor magnet 53, said circuit extending from ground G³ through the springs 72 and 73, motor magnet springs 70 and 71, through the winding of the motor magnet 53 to the battery lead 103, thence through battery B to ground G. The motor magnet 53, upon energizing, attracts its armature 67, whereby the pawl 68 engages the ratchet wheel 54, advancing the latter one step. When the armature 67 is attracted against the magnet cores, the springs 70 and 71 disengage, thereby breaking the energizing circuit through the motor magnet 53 and permitting the armature 67 to return to normal position. The cam 55, being in engagement with the pin 63 upon the ratchet wheel 54, is operated to advance the plunger shaft 43, and all idle plungers that may be in normal locked position with the shaft 43, opposite another terminal similar to the terminal Q, assuming the next succeeding trunk is idle. Consequently, the wiper arm 58 is carried from the contact point 60 (which corresponds to the terminal Q) to the contact point 74, which latter corresponds to the terminal before which the advanced idle plungers are now resting. Suppose that nine subscribers have called, and that the master switch has thus operated nine steps, carrying the wiper 58 to the last contact point 59. Now, when the motor magnet 53 operates for the next step, when the tenth subscriber calls, the wiper 58 passes back and drops into engagement with the contact point 60. If the first trunk is still busy the wiper 58 finds a battery potential on the contact 60, and an energizing circuit is established through the differential relay 56, which in turn operates to close an energizing circuit through the motor magnet 53. The current through the said relay 56 flows from the said contact 60 through the wiper 58 to the common segment 57, and through the winding 158 of the differential relay 56 to ground $G^2$. When this relay energizes it operates to close the circuit through the motor magnet 53, and the motor magnet then operates, as previously explained, to rotate the ratchet wheel 54 one step, and the master switch bank wiper 58 one step also and into engagement with the second segment 74. When thus advanced one step the plunger shaft 43 carries all idle plungers that are in locking engagement with said shaft opposite the second bank terminal, as previously explained. If there should still be a guarding potential at the bank segment 74, the differential relay 56 will remain energized, whereby the energizing circuit through the motor magnet 53 is again completed when the motor magnet springs 70 and 71 again engage, and as a result the motor magnet 53 is again operated, whereby the plunger shaft 43 and the master switch wiper 58 are advanced another step. This process continues as long as the wiper 58 continues to find segments with guarding potentials. As soon as an idle segment is found, however, the energizing circuit through the relay 56 is broken, at which time the said relay in turn breaks the energizing circuit for the motor magnet 53, until the next subscriber makes a call. At the instant that the plunger 21 enters the bank terminal Q the following springs are pressed into contact: 35 and 36, 37 and 38, 39 and 40, and 41 and 42. The engagement of the springs 39 and 40 closes a circuit through the cut-off relay 48 extending from ground $G^4$ through the springs $16^a$ and $17^a$, springs $18^a$ and $19^a$ of the relay $23^a$ (which is now energized, as will be explained), conductor 157, through the springs 40 and 39, conductor 160, relay 48 to the battery lead 103, thence through battery B to ground G. The said relay, upon energizing, operates to carry the springs 49 and 51 out of engagement with the springs 50 and 52. When these springs disengage, the resistance coil 154 is disconnected from the vertical line conductor 19, and the trip magnet 23 is disconnected from the rotary line conductor 20. The engagement of the bank springs 39 and 40 also establishes a guarding potential by way of the normal conductor 80 to the connector private bank contacts corresponding to the line that terminates in the line switch C, to prevent any subscriber from calling the said line after the calling subscriber at substation A removes his receiver preparatory to making a call, as explained. Also, the closure of connection between the springs 41 and 42 establishes a guarding potential at the master switch bank contact 60, over the following circuit: from battery B to the battery lead 103, thence through the winding of the release magnet 24, through the springs 41 and 42, conductor 159 to the said contact point 60. It will be understood that the bank terminal Q, being the first bank terminal of the line switch bank, corresponds to the first segment 60 of the master switch bank O and, therefore, to the trunk-line the conductors 75, 76 and 77 of which terminate in the first-selector switch E. This guarding potential protects the seized trunk conductors 75, 76 and 77 from being seized by other plungers, as already explained. The closure of connection between the springs 35 and 36 extends the calling subscriber's vertical line conductor 19 to the vertical trunk conductor 75 and the side switch wiper 84 of the first-selector switch E. The closure of contact between the springs 37 and 38 in a similar manner extends the subscriber's rotary line conductor 20 to the rotary trunk conductor 76 and to the side switch wiper 85 of the selector E. The subscriber has thus established connection with the next selector switch, which is now operated by the impulses that are delivered when the dial returns to normal position for the first digit. When the subscriber's line conductors 19 and 20 are thus extended to the first-selector switch E, an energizing circuit is established through the line relay 101 extending from ground $G^5$ through the winding 104 to the contact point 90, side switch wiper 85, winding $22^a$ of the relay $23^a$, trunk conductor 76, through the bank springs 38 and 37 to the rotary line conductor 20, through the springs 17 and 18, impulse springs 15 and 14, primary winding 5, transmitter 7 to the vertical line conductor 19, through the bank springs 35 and 36, trunk conductor 75, winding 21[a] of the relay 23[a], side switch wiper 84, contact point 89, through the winding 102 to the battery lead 103, thence through battery B to ground G. Both windings of the relay 23[a] being included in this circuit, the said relay operatively energizes to place the springs 19[a] and 18[a] in contact, thereby providing the guarding potential for protecting the line and completing an energizing circuit for the bridge-cut-off relay 48, as explained. The relay 101, upon energizing, operates to place the springs 161 and 162 in contact, whereby an energizing circuit is established through the release relay 112 extending from ground G[6] through the springs 161 and 162, relay 112 to the battery lead 103, thence through battery B to ground G. The release relay 112, upon energizing, operates to carry the spring 163 out of engagement with the spring 164 and into engagement with the spring 165. This is the condition of the first-selector switch E when the subscriber operates the dial for the first digit. The first digit being 2, the impulse spring 14 is twice carried out of engagement with the impulse spring 15. As a result the energizing circuit through the line relay 101 is broken twice, and the spring 161 comes into contact with the spring 166 twice. After the two impulses are thus transmitted, the line relay 101 again energizes and carries the spring 161 into contact with the spring 162. As previously explained, the relay 112 is slow-acting—that is, slow to deenergize; and when its energizing circuit is momentarily broken, during the vertical impulses just delivered, the said relay does not deenergize, but remains in an operated position with the spring 163 in contact with the spring 165. Then, when the spring 161 engages the spring 166, two impulses are transmitted to the vertical magnet 105 from ground G[6] through the springs 161 and 166 to the springs 163 and 165, through the private magnet relay 106, through the winding of the vertical magnet 105, contact point 92, side switch wiper 87 to the battery lead 103, thence through battery B to ground G. The impulses being transmitted, the vertical magnet 105 is thereby energized twice, and the shaft wipers are given two vertical steps in the well-known manner. It will be seen that the private magnet relay 106 is included in the energizing circuit of the vertical magnet 105. This relay also energizes, but being a slow-acting relay it energizes on the first impulse and remains so until all the impulses are transmitted. This relay, upon energizing, operates to close the springs 167 and 168 in contact, whereby an energizing circuit is established through the private magnet 88. This circuit extends from ground G[6] through the springs 167 and 168, private magnet 88 to the battery lead 103, thence through battery B to ground G. The private magnet relay 106 deenergizes after the last vertical impulse, since its energizing circuit is no longer maintained after the springs 161 and 166 disengage. Hence, the said relay deenergizes, permitting the springs 167 and 168 to disengage, whereby the energizing circuit through the private magnet 88 is in turn broken, which private magnet now deenergizes and permits the side switch to pass from first to second position, permitting the side switch wipers 86 and 87 to engage the contact points 95 and 96, respectively. The closure of contact between the side switch wiper 87 and the contact point 96 sets up an energizing circuit for the rotary magnet 107 from ground G[5] through the interrupter spring 169, through the winding of the rotary magnet 107, contact point 96, side switch wiper 87 to the battery lead 103, thence through battery B to ground G. The said rotary magnet then operates to rotate the shaft wipers 81, 82 and 83 of the selector E into engagement with the first contact of the second level of the selector banks, from which contact it is assumed the trunk-line conductors 170, 171 and 172 lead to the second-selector switch F. If the first trunk-line is busy, however, and the wipers have to pass over busy trunk-lines, then as soon as the private wiper 83 engages the first private bank contact, the private magnet 88 again energizes, locking the side switch in second position. The energizing circuit for said private magnet extends from the grounded terminal G of the battery B through an occupying switch (not shown), through the private wiper 83, thence through the conductor 173 to the side switch wiper 86, contact point 95, through the winding of the private magnet 88 to the battery lead 103, thence through battery B to ground G. The private magnet 88, upon thus becoming energized, locks the side switch wiper 87 in engagement with the contact point 96, whereby the rotary magnet 107 will be energized step by step until the wipers are carried beyond the last busy trunk-line. At the instant that the private wiper leaves the last busy contact point the energizing circuit through the private magnet 88 is destroyed, and as a result the selector side switch passes to third position. If, however, there are no busy trunk-lines, the private magnet 88 releases the side switch to third position as soon as the wipers are carried into engagement with the first trunk-line. As soon as the side switch passes to third position, as stated, the subscriber's line conductors 19 and 20 are extended to the conductors 170 and 171, which, in this case, it is assumed lead to the second-selector switch F. The extending of the line occurs, of course, as soon as the side switch wipers 84 and 85 engage the contact points 97 and 98, respectively. When the subscriber's line conductors are thus extended to the selector switch F an energizing circuit is established through the line relay 114, in the same manner in which the energizing circuit was established through the line relay 101 of the selector E when the subscriber's line conductors 19 and 20 were extended through the line switch bank to the trunk conductors 75 and 76. The relay 114, upon energizing, operates to shift the spring 174 from the spring 175 to the spring 176. When the springs 174 and 176 engage, an energizing circuit is established through the release relay 124. This circuit extends from ground $G^7$ through the springs 174 and 176, through the relay 124 to the battery lead 103, thence through battery B to ground G. The relay, upon energizing, operates to shift the spring 177 from the spring 178 to the spring 179, and the springs 180 and 181 are also closed in contact. This operation of the second-selector switch F occurs at the instant that the side switch wipers 84 and 85 of the selector switch E pass to third position and extend the subscriber's line conductors 19 and 20 to the second-selector switch F. When the second-selector switch, therefore, thus operates, a guarding potential is established at the private wiper 83 for protecting the seized trunk-line conductors 171 and 172 against seizure by another calling first-selector. This guarding potential extends from ground $G^8$ to the contact point 182, side switch wiper 183, through the springs 181 and 180, conductor 172 to the contact engaged by the private wiper 83. Furthermore, when the first-selector switch E operates and the side switch passes to third position, a new energizing circuit is established through the release relay 112. This energizing circuit extends from ground $G^8$ at the selector switch F through the springs 181 and 180, conductor 172, shaft wiper 83, conductor 173, through the side switch wiper 86, contact point 99, relay 112, through the battery lead 103, thence through battery B to ground G. The relay 112 thus remains in an operated position with the spring 163 in engagement with the spring 165, but the line relay 101 returns to normal position when the side switch wipers 84 and 85 engage the contact points 97 and 98, respectively. The energizing circuit through the line relay 114 extends from ground $G^9$ through the winding 116 to the side switch wiper 118, thence through the conductor 171, winding $22^a$, conductor 76 and line conductor 20, through the primary circuit of the substation, through the vertical line conductor 19, thence through the trunk conductor 75, winding $21^a$, conductor 170, side switch wiper 117, through the winding 115 of the relay 114 to the battery lead 103, thence through battery B to ground G. When the dial returns to normal position for the second digit 2, this circuit through the line relay 114 is interrupted twice, when the impulse spring 14 is carried out of engagement with the spring 15 by the impulse teeth on the wheel 10. The circuit being interrupted twice, said relay 114 momentarily deenergizes twice, thus permitting the spring 174 to engage the spring 175 a like number of times, whereby an energizing circuit is twice completed through the vertical magnet 120 extending from ground $G^7$ to the springs 174 and 175, springs 177 and 179, through the winding of the private magnet relay 123, through the winding of the vertical magnet 120, contact point 184, side switch wiper 185 to the battery lead 103, and through battery B to ground G. The private magnet relay 123 being included in this circuit energizes, and since it is a slow-acting relay it remains in an operated position until the last vertical impulse is transmitted, and the relay 114 remains energized with the spring 174 in contact with the spring 176, whereby the circuit through the private magnet relay and the vertical magnet 120 remains open. When the relay 123 energizes, the springs 186 and 187 are pressed into contact, thereby causing an energizing current to flow through the private magnet 122, the circuit extending from ground $G^7$ through the springs 187 and 186, through the winding of the private magnet 122 to the battery lead 103, thence through battery B to ground G. When the relay 123 deenergizes and breaks the energizing circuit through the private magnet 122, the private magnet also deenergizes and permits the side switch to pass from first to second position. When the side switch wiper 185 passes to second position and into engagement with the contact point 188, an energizing circuit is established through the rotary magnet 119, which latter now operates, as explained in connection with the rotary magnet 107 of the selector switch E, to select an idle trunk-line leading to the connector switch. After the switch comes to rest, with the side switch in third position, the shaft wipers 189, 190 and 191 are in engagement with the trunk conductors 192, 193 and 194, respectively, which lead to the connector switch H (Fig. 2). At the instant that the side switch wipers 117 and 118 pass to third position, in engagement with the contact points 195 and 196 the subscriber's line conductors are extended to the connector switch H and an energizing circuit is established through the line relay 128 and the differential relay $23^a$, in the same manner in which the energizing circuit was established through the line relay 114 of the selector switch F when the side switch wipers of the first-selector passed to third position. The energizing circuit through the line relay 128 extends from ground $G^{10}$ through the winding 130, trunk conductors 193, 171 and 76 to the line conductor 20, thence through the substation to the vertical line conductor 19, trunk conductors 75, 170 and 192, thence through the winding 129 to the battery lead 103, and through battery B to ground G. The line relay 128, upon energizing, operates to shift the spring $196^a$ from the spring 197 to the spring 198, whereby an energizing circuit is established through the release relay 133 extending from ground $G^{11}$ through the springs $196^a$ and 198, relay 133 to the battery lead 103, thence through battery B to ground G. When the relay 133 energizes, the spring 199 is shifted out of contact with the spring 200 and into contact with the spring 201, and the spring 202 is shifted into engagement with the spring 203. This primary operation of the connector relays 128 and 133 occurs at the instant that the side switch wipers 117 and 118 of the selector F pass to third position and extend the subscriber's line conductors to the connector H. The engagement of the springs 203 and 202 establishes a guarding potential for protecting the trunk-line conductors 192, 193 and 194 against seizure by another line and second-selector. This potential extends from ground $G^{11}$ to the side switch wiper 139, springs 203 and 202, conductor 194 to the private bank contact engaged by the shaft wiper 191. Furthermore, when the side switch of the second-selector F passes to third position a new energizing circuit is established through the release relay 124, said circuit extending from ground $G^{11}$ at the connector switch to the conductor 194, through the shaft wiper 191, side switch wiper 204, conductor 205, through the release relay 124 to the battery lead 103, thence through battery B to ground G. Also, this same guarding potential established at the contact engaged by the private shaft wiper 191 is extended to the private bank contact engaged by the shaft wiper 83 of the first-selector E, when the side switch of the second-selector F passes to third position. The path over which this potential extends is as follows: from ground $G^{11}$ at the connector switch H (Fig. 2) through the side switch wiper 139, springs 203 and 202, conductor 194, shaft wiper 191, side switch wiper 204, conductor 205, contact point 206, side switch wiper 183, springs 181 and 180, conductor 172 to the bank contact engaged by the private wiper 83 of the selector switch E. The operation of the dial for the last two digits affects the connector switch, and when the dial is operated for the third digit 2 the impulse spring 14 is twice carried out of engagement with the spring 15, thereby momentarily deenergizing the line relay 128 twice, whereby the spring $196^a$ twice engages the spring 197, thus sending two impulses to the vertical magnet 131 from ground $G^{11}$ through the springs $196^a$ and 197, springs 199 and 201, through the vertical magnet 131, contact point 207, side switch wiper 140, private magnet relay 134 to the battery lead 103, thence through battery B to ground G. The private magnet relay 134 energizes when the first impulse is delivered, and since the said relay is slow-acting it remains in an operated position until all the vertical impulses are sent. The vertical magnet, upon being energized, operates one step at a time to carry the shaft wipers 125, 126 and 127 two steps to a point opposite the second level. The relay 134, upon energizing, shifts the spring 209 out of engagement with the spring 210 and into engagement with the spring 211; also, the spring 212 is shifted out of engagement with the spring 211. When the springs 209 and 211 engage, an energizing circuit is established through the private magnet 135 from ground $G^{13}$ through the springs 211 and 209, private magnet 135 to the battery lead 103, thence through battery B to ground G. The relay 134, being a slow-acting relay, remains in an operated position while the vertical impulses are being sent; but after all the impulses are delivered, and the line relay 128 returns to its operated position, the circuit through the relay 134 becomes broken, thus permitting the springs 212 and 209 to return to normal position. When the springs 209 and 211 disengage, the circuit through the private magnet 135 becomes broken, whereby the said magnet deenergizes, permitting the side switch to pass from first to second position. The calling subscriber now operates the calling device for the last digit O, thereby transmitting ten impulses and operating the line relay 128 ten times. Each time that the line relay springs $196^a$ and 197 engage, an energizing circuit is established through the rotary magnet 132 from ground $G^{11}$ through the said springs $196^a$ and 197 and through the springs 199 and 201, rotary magnet 132 and locking-relay springs $211^a$ and $212^a$ to the contact point 213, thence through the side switch wiper 140, and through the private magnet 134 to the battery lead 103, thence through battery B to ground G. Again the private magnet relay energizes, as in the previous case, remaining so until all the impulses are transmitted, thereby retaining the private magnet energized also. The rotary magnet 132 then operates to rotate the shaft wipers into engagement with the desired line #2220. If this line is busy at the time, the connector side switch will be locked in second position, in the manner to be described, and the calling subscriber is given the busy-signal, thus making it impossible to extend the calling line into connection with the called line.

Before describing the results that follow when the connector find a busy line, the description of how a connection is established will be completed. As soon as the line relay 128 ceases to operate for the last digit, the private magnet relay 134 deenergizes, as heretofore explained, in this instance permitting the side switch to trip to third position. The result is that the side switch wipers 136, 137, 138, 139 and 140 engage the contact points 214, 215, 216, 217 and 218, respectively. When the side switch wiper 138 engages the contact point 216 a guarding potential is completed at the private wiper 127 for protecting the seized line from outside interference while the connection is established. This guarding potential extends from ground $G^{14}$ to the contact point 216, thence by way of the side switch wiper 138, locking-relay springs 219 and 220 to the private wiper 127. Not only does this guarding potential prevent other connectors from seizing the same line over multiples of the normal conductors 221, 222 and 223, but it also provides means for energizing the cut-off relay 224 of the line switch C′, whereby the switch C′ is prevented from operating when the called subscriber removes his receiver 225 from the switch-hook 226. It will also be seen that when the side switch passes to third position the trunk-release conductor 194 that runs between the second-selector and the connector is provided with guarding potential from ground $G^{11}$ through the line relay springs $196^a$ and 198, contact point 217, side switch wiper 139, release relay springs 203 and 202 to the trunk conductor 194. However, while the side switch is in first or second position a guarding potential for this trunk conductor 194 is also provided from ground $G^{11}$, but through the side switch wiper 139 direct. The reason for this is that the guarding potential from ground $G^{11}$ is interrupted while the line relay 128 is operating, and there is some liability of some other selector similar to the second-selector F stopping on the same trunk-line. After the side switch passes to third position, however, there is no such possibility, and the potential is provided from ground $G^{11}$ through the line relay springs, as stated, in order to expedite the release of the selectors when the calling subscriber hangs up his receiver Of course, when the side switch wipers 136 and 137 engage their third-position contact points 214 and 215, the calling subscriber's line is placed in connection with the called subscriber's line over the heavy conductors shown, passing through the ringer relay springs 227 and 228 on one side, and 229 and 230 on the other side. As soon as connection is thus established the ringer relay 145 is energized over the circuit established when the side switch wiper 140 engages the contact point 218, the energizing current flowing from ground $G^{15}$ through the interrupter 144, through the back-ridge relay springs 231 and 232, ringer relay 145, conductor 233, contact point 218, side switch wiper 140, private magnet relay 134 to the battery lead 103, thence through battery B to ground G. It will be seen that as the interrupter 144 revolves, the energizing circuit of the ringer relay 145 will be broken periodically, so as not to ring the called subscriber continuously. It will be seen that each time that the ringer relay is energized the springs 228 and 230 are separated from the ringer relay springs 227 and 229, thereby breaking the calling line from the called line and pressing the springs 228 and 230 onto the springs 244 and 245, which are the terminals of the ringer generator I. As a result ringing current is sent over the called line for energizing the bell 234 while the springs 237 and 246 are in contact. It should be explained that the connector H, like all the connectors of the two-thousand two-hundred group, may be arranged to draw its ringing current from a ringer generator I that furnishes current of such character that only the ringer 234 of the substation #2220 will be operated by said current; while the ringers of all other substations on the same line may be so tuned that they will not respond to the current from said generator. Similarly, the connectors of the two-thousand three-hundred group, which are employed when substations of this group are called, may be arranged to draw their ringing current from a ringer generator that furnishes current of such character that only ringers tuned to respond to the current of this particular character will be operated. Likewise, the connectors of the four and one hundred groups of the two-thousand may in turn draw their ringing current from still other generators that supply current of such characters that only these ringers that are correspondingly tuned will operate. It is evident, then, that when generator current is projected out on the line by the connector H of the two-thousand two hundred group only the ringer 234 will be operatively affected. However, as soon as the called subscriber answers, the back-bridge relay 141 is energized by a flow of current from ground $G^{14}$, contact point 216, side switch wiper 138, winding 143 of the back-bridge relay 141, conductor 235, ringer relay springs 229 and 230, side switch wiper 137, contact point 215, rotary line wiper 126, rotary normal conductor 222, rotary line conductor 236, switch-hook springs 237 and 238, impulse springs 339 and 240, transmitter 241, vertical line conductor 242, vertical normal conductor 221, vertical line wiper 125, contact point 214, side switch wiper 136, ringer relay springs 228 and 227, conductor 243, winding 142 of the back-bridge relay 141, thence to the battery lead 103, and through battery B to ground G. When the back-bridge relay 141 is once energized, however, the energizing circuit for the ringer relay 145 is interrupted at a point between the springs 231 and 232, thus making it impossible for the ringer relay to energize as long as the called subscriber is on the line. The subscribers being thus connected, they may communicate over the main talking conductors indicated by the heavy lines and including on one side the condenser 147 at the connector H and on the other side the condenser 148. This talking circuit also includes the windings 21[a] and 22[a] of the double-wound coil 23[a]. For the purpose of clearing the talking circuit of the impedance of these coils, the condensers 247 and 248 are provided across the said windings, as shown. After the subscribers are through talking, if the calling subscriber hangs up his receiver he opens the line circuit at a point between the springs 17 and 18, thereby initiating the release of all of the switches. This release is as follows: At the instant that the circuit is broken between the said springs 17 and 18, the double-wound line relay 128 and the release relay 133 of the connector H deenergize. At the instant that the slow-acting relay 133 and the line relay 128 deenergize, the energizing circuit for the release magnet 133[a] is closed at a point between the springs 199 and 200 and at another point between the springs 196[a] and 197. A flow of current is, therefore, set up from ground $G^{11}$ through the springs 196[a] and 197, through the springs 199 and 200 to the release magnet 133[a], thence through said magnet and to the off-normal spring 132[a], to the contact point 131[a], and to the battery lead 103, thence through battery B to ground G. The release magnet instantly releases the connector switch shaft and side switch, thereby breaking the energizing circuit through the back-bridge relay 141, if the called subscriber has not in the meantime restored his receiver, and also the energizing circuit through the bridge-cut-off relay 224 of the called line switch C′. As soon as the connector switch shaft reaches its lowest position it breaks the circuit for the release magnet 133[a] by separating the off-normal spring 132[a] from the contact point 131[a], at which instant the release magnet of the connector is also restored. The operation of the line relay 128 and of the slow-acting relay 133 not only causes the release of the connector, as described, but also the release of the preceding switches, because the ground connection from ground $G^{11}$ to the trunk-release conductor 194 is interrupted by both of these relays. Since the release relays 124 and 112 are dependent upon that ground for their energized condition, as already explained, it follows that they will fall back, with the following results: As soon as the release relay 124 of the second-selector F deenergizes, the spring 177 falls back into normal engagement with the spring 178, thereby closing an energizing circuit for the release magnet 121 from ground $G^7$ through the springs 174 and 175, and through the springs 177 and 178 to the release magnet 121, thence to the contact point 249, off-normal spring 250 to the battery lead 103, thence through battery B to ground G. As soon as the release magnet 121 energizes, the second-selector side switch and switch shaft are restored, which latter, upon reaching its lowest position, opens up the release circuit at a point between the off-normal spring 250 and the contact point 249, whereby the release magnet 121 is deenergized. When the release relay 112 of the selector E deenergizes, the springs 163 and 164 are brought into contact, and as a result the energizing circuit for the release magnet 108 is closed. The energizing current for this release magnet 108 then flows from ground $G^6$ through the springs 161 and 166, and through the said springs 163 and 164 to the release magnet 108, thence through said magnet to the contact point 110, off-normal spring 111 to the battery lead 103, thence through battery B to ground G. The release magnet, upon energizing, then restores the first-selector side switch and switch shaft, which latter, upon reaching its lowest position, opens the energizing circuit for the release magnet 108 at a point between the off-normal spring 111 and contact point 110. Furthermore, when the relay 112 deenergizes and closes the springs 163 and 164 in contact, a series energizing circuit through the release magnet 24 and the release relay 113 is established. This circuit extends from ground $G^6$ through the springs 161 and 166, springs 163 and 164, through the relay 113, springs 251 and 252, conductor 77 to the bank springs 42 and 41, thence through the release magnet 24 of the line switch C to the battery lead 103, and through battery B to ground G. It will be seen that the release magnet will then energize and, as previously explained, cause the trip armature 27 to fall over the plunger arm 22, whereby the members 32 and 33 engage. (See Fig. 4). As the release relay 113 energizes and separates the springs 251 and 252, the series release circuit is broken for an instant, which permits the release magnet 24 of the line switch C to deenergize, thereby withdrawing the plunger 21 from the bank terminal Q. As a result the bank springs 41 and 42, as well as the other bank springs of the line switch C, are separated, thus preventing any other action from the trunk. After the switches are thus restored the calling subscriber can, of course, then proceed to make another call.

Returning now to that stage of the call where the calling subscriber was operating the connector switch in accordance with the last digit 0, it will be explained what takes place in the event that the desired line is busy. When the line #2220 is calling, or when it has been called by someone else, the private bank contacts in which the normal conductor 223 terminates are connected to ground. If another connector switch has called the line, this guarding potential is supplied through the connector switch from a ground terminal similar to the ground terminal $G^{14}$ in the connector switch H, as already explained; but if the line switch C′ is calling, a guarding potential is established from the trunk-line relay ground as in Fig. 1, thence to the private bank contact. In a similar manner the line switch C protects the calling line A (when the bank springs 39 and 40 come into contact) from ground $G^4$, from which ground connection is established through the said bank springs to the private normal conductor 80. Therefore, when the subscriber sends in the last impulse the private wiper 127 is carried onto the grounded contact; and when the slow-acting relay 134 of the connector deenergizes, instead of the side switch tripping to third position, as in the case where the line is not busy, it is locked and the calling subscriber is then given the busy-signal. The method by which this side switch is locked is as follows: The slow-acting relay springs 209, 210 and 211 are so arranged that as the relay 134 deenergizes, the spring 209 engages the spring 210 before it leaves the spring 211, and in this way the private magnet 135 is prevented from deenergizing, because the spring 210 is connected with the private wiper 127 at the time, over the following circuit: from the private wiper 127 to the locking spring 220, thence to the spring 219 and through the winding 143 of the back-bridge relay 141 to the talking line conductor 235, thence through the ringer relay springs 229 and 230 to the side switch wiper 137, contact point 253 (the side switch being in second position) to the slow-acting relay spring 210. Therefore, when the spring 209 engages the spring 210 the private magnet 135 is not deenergized, since the energizing circuit is maintained from the private wiper 127 to the said spring 210, as described, thence through the spring 209, and through the private magnet 135 to the battery lead 103, thence through battery B to ground G. The private magnet therefore remains energized, retaining the side switch in second position. It will be seen that at the same time the back-bridge relay 141 energizes in series with the private magnet 135, over this circuit, from the private wiper 127. Therefore, the back-bridge relay 141, upon energizing, presses the springs 254 and 255 into contact, thereby energizing the locking relay 146 over the following circuit: from ground $G^{13}$ through the slow-acting relay springs 211 and 212, through the private magnet springs 256 and 257, through the said relay 146, and through the back-bridge relay springs 255 and 254 to the battery lead 103, thence through battery B to ground G. It will be seen that when the relay 146 energizes, the connection between the rotary magnet 132 and the battery lead 103 is broken at a point between the springs $211^a$ and $212^a$. The object of this arrangement is to prevent the calling subscriber from further rotating the connector switch if he should attempt to operate his dial while receiving the busy-signal—that is, while the connector switch is locked in second position. It will also be seen that when the relay 146 energizes, the circuit for maintaining the private magnet 135 energized is shifted from the private wiper 127 to the spring 258, which latter is connected to ground $G^{19}$. The object of this arrangement is to prevent the side switch from unlocking and passing to third position, if the switch that is maintaining the called line busy should be released while the calling subscriber A (Fig. 1) is receiving the busy-signal. It will be evident that if the ground $G^{19}$ were not substituted for the ground at the private wiper 127, the private magnet 135 would deenergize if the switch that is supplying ground at the private wiper 127 should release, which would, of course, be undesirable. It will also be seen that the relay 146, upon energizing, closes the springs 259 and 153 in contact, thereby establishing the busy circuit as follows: from the secondary winding of the busy coil 151 through the springs 153 and 259 to the second-position side switch contact point 260, side switch wiper 136, ringer relay springs 228 and 227, through the condenser 147, through the substation A to the rotary side of the line, then over said rotary side back to the connector H, through the winding 130 of the line relay 128 to ground $G^{16}$ to the interrupter ground $G^{20}$, through the interrupter 149 to the primary winding of the busy coil 151 back to the secondary winding. When the calling subscriber receives the busy-signal he understands that the line is busy and hangs up his receiver. The line circuit is opened, as already explained, with the result that the line and slow-acting relays 128 and 133 of the connector H deenergize, causing the release of the connector and all other switches, as heretofore explained. It will, of course, be seen that as soon as the side switch is restored the energizing circuit for the back-bridge relay 141 that includes the winding 143 thereof, and for the private magnet 135, is broken when the side switch wiper 137 leaves the contact point 253. Now, since the energizing circuit for the locking relay 146 is controlled by the back-bridge relay 141, the said locking relay is also deenergized, and the connector switch is left in a normal condition.

In the foregoing it has been shown how a subscriber may operate the central office switches to establish connection with another line. It will now be pointed out how a subscriber may operate the central office apparatus to call and signal a party on the same line. This may be more clearly understood from an explanation of Fig. 3 when it is assumed that the subscriber at substation A desires to signal the subscriber at substation A′, whose number is 5320. To call this number the substation dial is operated in the usual manner. When the line switch operates to seize a trunk-line leading to a first-selector switch, a guarding potential is established at the connector bank through the trunk-line relay springs, as previously explained. The master switch D operates as usual to carry the idle plungers opposite the next available trunk-line. The impulses for the first digit 5 are received by the first-selector switch E, which operates to select an idle trunk-line leading to a second-selector F. The second-selector responds for the second digit 3 to select a connector switch H of the fifty-three-hundred group. This connector is operated by the last two digit impulses to select the line number 20 of this group. The usual guarding potentials are established to protect the various trunk-lines used in establishing the connection. As previously explained, the trunk-line relay $23^a$ operates when the impulses are transmitted. The operation of this relay is of no importance until this particular time—that is, when a subscriber is about to operate a connector switch to call back on his own line. This relay is provided for temporarily removing the guarding potential from the connector banks, so that the connector switch H will not find the line busy. The operation of the trunk-line relay $23^a$ is as follows: When the impulses are transmitted the relay $23^a$ deenergizes at each impulse, permitting the spring $19^a$ to engage the spring $20^a$ momentarily. The engagement of these two springs provides an energizing circuit for the slow-acting relay $15^a$ from ground $G^{12}$ through the said relay, springs $20^a$ and $19^a$, bank springs 40 and 39, through the winding of the bridge-cut-off relay 48 to the battery lead 103, thence through battery B to ground G. The relay $15^a$ thereupon energizes and separates the springs $16^a$ and $17^a$, whereby the guarding potential for the normals of the calling line is removed. It will be understood, of course, that while the relay $23^a$ energizes and deenergizes during each impulse, the slow-acting relay $15^a$ does not, since the intermittent closing of its energizing circuit is sufficient to maintain the said relay in an operated position. After the impulses are delivered the relay $23^a$ remains in an energized position, maintaining the guarding potential at the connector bank. From the foregoing it will be seen that while impulses are being transmitted, the protecting potential of the line is temporarily removed. When the connector switch is operated for the last digit O, the connector side switch does not lock in second position, but passes to third position, establishing connection with the desired line. The subscriber at substation A having operated the central office switches, including a first-selector, second-selector and connector switch H, to call subscriber A′ on his own line, now presses the signaling button $5^a$ in order that the ringer generator may be bridged across the line to signal the called subscriber. The connectors of the fifty-three-hundred group may be arranged to draw their ringing current from a generator of such character that only the ringer $260^a$ on the party-line will be sounded, as previously explained. When the subscriber A called the subscriber $A^2$, it was explained that the back-bridge relay 141 energized when the called subscriber answered and bridged his transmitter across the line. In this instance (the called and calling lines being identical) a provision is made whereby the effect of the bridge of the calling subscriber's transmitter is overcome, and the back-bridge relay 141 deenergized to permit the closing of the energizing circuit through the ringer relay 145, as follows: When the button $5^a$ is pressed the springs $6^a$ and $7^a$ disengage, introducing the high resistance coil $8^a$ into the circuit of the back-bridge relay 141 and the front-bridge line relay 128. When the resistance coil $8^a$ is placed in this circuit sufficient current does not flow to maintain the back-bridge relay in an energized position. Hence it falls back, closing the circuit through the ringer relay 145, as previously. However, sufficient current still flows to maintain the line relay 128 in its energized position and thus prevent a premature release of the switches. When the subscriber at substation A′ answers by removing the receiver from the switch-hook and bridging his transmitter across the line conductors, a new circuit is formed which shunts the resistance coil $8^a$. The relay 141 now energizes, breaking the circuit of the ringer relay 145. The two substations A and A′ are thus placed in communication, battery current for talking purposes being provided in the usual manner through the line relay 128 and the back-bridge relay 141. When the subscribers are through talking, the last one who restores his receiver to its switch-hook initiates the release of the central office switches in the usual manner, as explained.

Figure 6:
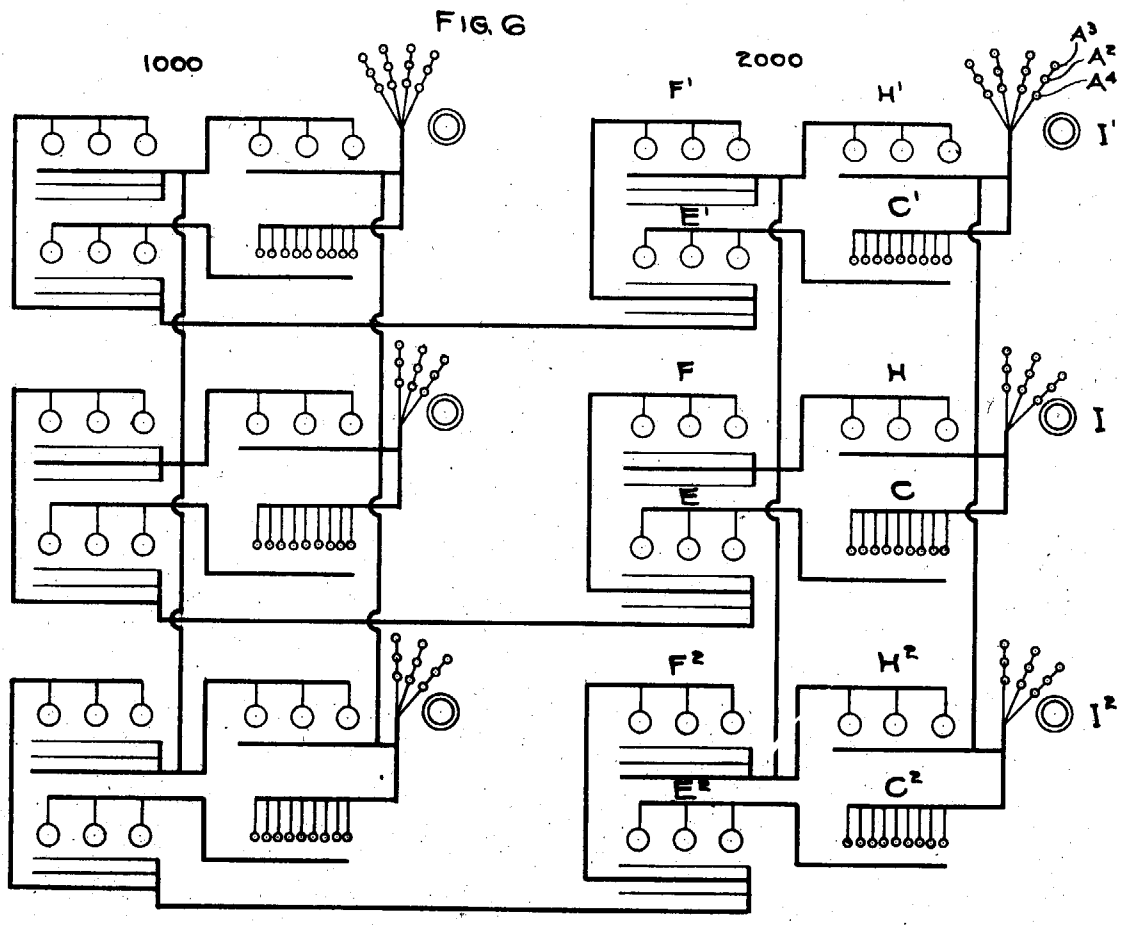
Fig. 6 represents diagrammatically the arrangement of the lines by means of which the different substations may be signaled selectively.

By referring to Fig. 6 a clearer understanding may be obtained of the arrangement by which the different substations may be signaled selectively. In said figure are shown a number of groups of lines, each of which is provided with three substations ($A^2$, $A^3$ and $A^4$) and connected to an individual or line switch. From the line switch groups trunks lead to first selector switches, from which latter switches trunks lead to second selector switches. From the second selectors trunks lead to connector switches. In this diagram the switches and substations are represented by circles and the different levels of bank contacts are represented by straight lines. It will be assumed that the substations $A^4$, $A^2$ and $A^3$ are numbered 2120, 2220, and 2320, respectively. Since the last two digits of each of these numbers are 20, the line to which these substations are connected would be connected to the last or "O" contact in the second level in each of the three groups of connectors H′, H and $H^2$. Each group of connectors is connected to a different generator, I, I′ or $I^2$, each having a different frequency. Since the group of connectors $H^2$ is connected to the first level of the second selector banks, the connection with the called line will be completed by one of these connectors if the number 2120 is called. Ringing current will then be supplied by the generator $I^2$, which is of the proper frequency to actuate only the bells at substation $A^4$. If number 2220 is called the connection will be completed by one of the connectors H, and ringing current will be furnished by generator I, which is of the proper frequency to signal substation $A^2$. Likewise, a connection for substation #2320 will be completed by the connector H′ and ringing current supplied by generator I′.

From the foregoing it will be seen that I provide efficient party-line service in a two-wire automatic telephone exchange system—that is to say, in a system in which the subscribers' lines are free from operating grounds outside of the exchange or central station. It will also be seen that I provide a two-wire automatic system in which party-line subscribers can signal each other on the same line through the medium of push-buttons at their respective stations, whereas any called subscriber who is not on the same line with the calling subscriber is automatically signaled from the exchange or central station. Furthermore, I provide a two-wire automatic system in which the connectors are capable of automatically locking on busy lines, without closing the connection from the calling line to the called line, the subscriber on the calling line being given a busy signal. Also, and through the medium of the slow-acting relays 48 and $15^a$ and the double-wound line relay $23^a$, a two-wire party-line subscriber can call back on his own line for the purpose of establishing telephonic communication with another subscriber on the same line. Thus I provide improved two-wire service in an automatic exchange, and in addition I provide party-line service in a two-wire trunking system. In connection with this system it will be understood that whenever I use the word "trunking" I mean any operation that carries the calling line nearer the called line. For example, in the connector switch I consider for the purposes of this application the first operation of the connector switch as a trunking operation.

What I claim as my invention is:—

1. In a telephone system, subscribers' lines, each substation having a calling mechanism operative in response to manual operation thereof to transmit current for one digit of the called number and then come to rest before further manual operation for the next digit, means for extending connection to a called line by using the two sides of the calling line in series, a plurality of substations on the called line, means for selectively ringing the different substations on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

2. In a telephone system, subscribers' lines, each substation having a calling mechanism operative in response to manual operation thereof to transmit current for one digit of the called number and then come to rest before further manual operation for the next digit, means responsive to the current corresponding to a plurality of digits of the called number for extending connection to a called line by using the two sides of the calling line in series, a plurality of substations on the calling line, means for releasing controlled from any calling substation on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

3. In a telephone system, the combination of substation-controlled means for ringing another substation on the same line of the calling subscriber, and automatic means for ringing a substation on a line other than the calling line.

4. In a telephone system, the combination of means for extending connection to the called line by using the two sides of the calling line in series, substation-controlled means for ringing another substation on the same line of the calling subscriber, and automatic means for ringing a substation on a line other than the calling line.

5. A two-wire selective ringing party-line automatic telephone exchange system free from operating grounds outside of the exchange or central station, a plurality of lines, a substation for each line, means for connecting any two lines, said means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line, each substation having a calling mechanism operative in response to manual operation thereof to transmit current for one digit of the called number and then come to rest before further manual operation for the next digit.

6. A party-line automatic telephone exchange system having release mechanism, and a high resistance at each substation on the party-line to prevent a release when one subscriber signals another on the same line.

7. In a telephone system, a ringing key, an automatic subscriber's line provided at the substation thereof with a high resistance coil normally short-circuited by the closed contacts of the ringing key.

8. In a telephone system, a ringing key, an automatic subscriber's line, means for automatically extending connection therefrom by using the two sides thereof in series, and a resistance coil in the line at the substation thereof normally short-circuited by the closed contacts of the ringing key.

9. In a telephone system, trunks for connection with calling lines, subscribers' lines, means for automatically extending connection to a called line by using the two sides of the calling line in series, a slow-acting bridge-cut-off relay for each line, and a double-wound relay and a slow-acting relay for each trunk to which calling lines can be directly connected, as set forth.

10. In a telephone system including party lines, trunks for connection with calling lines, means for enabling a subscriber to call back on his own line, comprising a slow-acting relay individual to the party-line, and a slow-acting relay and another relay for each trunk to which the party-line can be directly connected, as set forth.

11. In a telephone system, the combination of a party-line having a plurality of substations thereon, means for automatically extending connection therefrom by using the two sides of the line in series, each substation having a calling mechanism operative in response to manual operation thereof to transmit current for one digit of the called number and then come to rest before further manual operation for the next digit, trunk-release circuits, means for initiating the release over the line circuits, said first means comprising a trunk selector individual to the calling line, trunk lines accessible to said selector and means for said trunk selector responsive to perform the first trunking operation of the selector in response to the closure of both sides of the calling line in series to reject busy trunks and to select an idle trunk independent of any further action from the line.

12. In a telephone system, the combination of a party-line having a plurality of substations thereon, means for automatically extending connection therefrom by using the two sides of the calling line in series, each substation having a calling mechanism operative in response to manual operation thereof to transmit current for one digit of the called number and then come to rest before further manual operation for the next digit, trunk-release circuits provided with slow-acting release relays, and means for initiating the release over the line circuits.

13. A subscriber's telephone line free from operating grounds outside of the exchange or central station and provided with a slow-acting bridge-cut-off relay and a bridge normally closed through the contacts thereof.

14. A subscriber's telephone line free from operating grounds outside of the exchange or central station, a slow-acting bridge-cut-off relay, a bridge on said line normally closed through the contacts of said relay, a trunk, a double-wound line relay and a slow-acting relay for said trunk, and two circuits for the first slow-acting relay, one circuit through the winding of the second slow-acting relay and the other through the contacts of the same relay, both circuits controlled by said line relay.

15. A two-wire automatic telephone exchange system free from operating grounds at the substations thereof, provided with automatic means for locking on a busy line without connecting the calling line therewith, each substation having a calling mechanism operative in response to manual operation thereof to transmit current for one digit of the called number and then come to rest before further manual operation for the next digit.

16. A two-wire automatic telephone exchange system free from operating grounds outside of the exchange or central station, having release mechanism, and provided with locking relays for preventing release when the called line is busy.

17. In a telephone system, a calling device at a substation, a line switch, a bridge cut off relay for the said line switch, a connector switch, a trunk line for connecting the line switch with the connector switch, a double wound relay and a single wound relay allotted to the trunk, a private normal conductor for establishing a guarding potential at the connector private banks to prevent the line of said substation from being called after the line switch seizes the trunk line, said guarding potential established from ground under the control of the single wound trunk relay, the said double wound trunk relay adapted to respond to the calling device, an energizing circuit for the bridge cut off relay, an energizing circuit for the single wound trunk relay, the energizing circuit for the bridge cut off relay and the guarding potential circuit for the private normal conductor adapted to be closed when the double wound relay energizes, the said energizing circuit for the single wound relay adapted to be closed when the double wound relay deenergizes in response to the calling device, the said energizing circuit including the bridge cut off relay and adapted to be maintained while the calling device is operating, to remove the guarding potential from the private normal conductor to enable the connector to call back on the calling line, the said bridge cut off relay and the single wound trunk relay being made slow acting, whereby they may be maintained energized while the calling device is operating.

18. In a telephone system, a subscriber's calling device, a two-wire connector adapted to be controlled over a metallic line circuit, a side switch and a rotary magnet for said connector, and a locking relay adapted to energize, if the connector attempts to call on a busy line, for the purpose of locking the side switch in second position and giving the subscriber a busy-signal and opening up the operating circuit of the rotary magnet to prevent the operation of the connector if the subscriber continues to operate his calling device after the locking relay energizes.

19. In a telephone system, subscribers' lines free from operating grounds at the substations thereof, means including switches having vertical and rotary motion for extending connection to a called line by using the two sides of the calling line in series, a plurality of substations on the called line, each substation having a calling mechanism operative in response to manual operation thereof to transmit current for one digit of the called number and then come to rest before further manual operation for the next digit, means for selectively ringing the different substations on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

20. In a telephone system, subscribers' lines, means including switches controlled over the two sides of the line in series having vertical and rotary selecting motions for extending connection to a called line by using the two sides of the calling line in series, a plurality of substations on the calling line, each substation having a calling mechanism operative in response to manual operation thereof to transmit current for one digit of the called number and then come to rest before further manual operation for the next digit, means for releasing controlled from any calling substation on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

21. In a telephone system, the combination of substation-controlled means for ringing another substation on the same line of the calling subscriber, automatic means having vertical and then rotary motion to find the calling line, and automatic means for ringing a substation on a line other than the calling line.

22. In a telephone system, the combination of means including switches having vertical and rotary motion for extending connection to the called line by using the two sides of the calling line in series, substation-controlled means for ringing another substation on the same line of the calling subscriber, and automatic means for ringing a substation on a line other than the calling line.

23. A two-wire selective ringing party-line automatic telephone exchange system, having switches controlled over the two sides of the line in series operative by vertical motion to select groups and by rotary motion to connect with a line in the selected group, said system comprising also a trunk selector individual to each line, trunk lines accessible to said selector, means for said trunk selector responsive to perform the first trunking operation of the selector in response to the closure of both sides of the calling line in series to reject busy trunks and to select an idle trunk independent of any further action from the line, each substation having a calling mechanism operative in responsive to manual operation thereof to transmit current for one digit of the called number and then come to rest before further manual operation for the next digit.

24. A party-line automatic telephone exchange system having release mechanism, and provided with a high resistance at each substation on the party-line to prevent a release when one subscriber signals another on the same line, and having switches operative by vertical motion to select groups and by rotary motion to connect with a line in the selected group.

25. In a telephone system, a ringing key, in combination with switches having vertical and rotary motion for the line wipers thereof, an automatic subscriber's line provided at the substation thereof with a high resistance coil normally short-circuited by the closed contacts of the ringing key.

26. In a telephone system, a ringing key, an automatic subscriber's line, means including switches having vertical and rotary motion for automatically extending connection therefrom by using the two sides thereof in series, and a resistance coil in the line at the substation thereof normally short-circuited by the closed contacts of the ringing key.

27. In a telephone system, trunks for connection with calling lines, subscribers' lines, means including switches having vertical and rotary motion for automatically extending connection to a called line by using the two sides of the calling line is series, a slow-acting bridge-cut-off relay for each line, and a double-wound relay and a slow-acting relay for each trunk to which calling lines can be directly connected, as set forth.

28. In a telephone system including party lines and trunk lines extending therefrom, means including switches having vertical and rotary motion for enabling a subscriber to call back on his own line, comprising a slow-acting relay individual to the party-line, and a slow-acting relay and another relay for each trunk to which the party-line can be directly connected, as set forth.

29. In a telephone system, the combination of a party-line having a plurality of substations thereon, each substation having a calling mechanism operative in response to manual operation thereof to transmit current for one digit of the called number and then come to rest before further manual operation for the next digit, means including switches having vertical and rotary motion for automatically extending connection therefrom by using the two sides of the line in series, trunk-release circuits, means for initiating the release over the line circuits, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

30. In a telephone system, the combination of a party-line having a plurality of substations thereon, each substation having a calling mechanism operative in response to manual operation thereof to transmit current for one digit of the called number and then come to rest before further manual operation for the next digit, means including switches having vertical and rotary motion for automatically extending connection therefrom by using the two sides of the calling line in series, trunk-release circuits provided with slow-acting release relays, and means for initiating the release over the line circuits.

31. A subscriber's telephone line, in combination with switches controlled over the two sides of the line in series having vertical motion to select groups and rotary motion to connect with a line in the selected group, and provided with a slow-acting bridge-cut-off relay and a bridge normally closed through the contacts thereof.

32. A two-wire automatic telephone exchange system comprising switches controlled over the two sides of the line in series having one motion to select groups and rotary motion to connect with a line in the selected group, and provided with automatic means for locking on a busy line until the calling subscriber replaces his receiver without connecting the calling line therewith.

33. In a telephone system, subscribers' lines, means for extending connection to a called line by using the two sides of the calling line in series, a plurality of substations on the called line, each substation having a calling mechanism operative in response to manual operation thereof to transmit current for one digit of the called number and then come to rest before further manual operation for the next digit, centralized means for supplying battery current over the lines for both talking and operating purposes, means for selectively ringing the different substations on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

34. In a telephone system, subscribers' lines, means responsive to the current corresponding to a plurality of digits of the called number for extending connection to a called line by using the two sides of the calling line in series, a plurality of substations on the calling line, each substation having a calling mechanism operative in response to manual operation thereof to transmit current for one digit of the called number and then come to rest before further manual operation for the next digit, centralized means for supplying battery current over the lines for both talking and operating purposes, means for releasing controlled from any calling substation on the party-line, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

35. In a telephone system, the combination of substation-controlled means for ringing another substation on the same line of the calling subscriber, centralized means for supplying battery current over the lines for both talking and operating purposes, and automatic means for ringing a substation on a line other than the calling line.

36. In a telephone system, the combination of means for extending connection to the called line by using the two sides of the calling line in series, substation-controlled means for ringing another substation on the same line of the calling subscriber, centralized means for supplying battery current over the lines for both talking and operating purposes, and automatic means for ringing a substation on a line other than the calling line.

37. A two-wire selective ringing party-line automatic telephone exchange system provided with centralized means for supplying battery current over the lines for both talking and operating purposes, a plurality of lines, a substation for each line, means for connecting any two lines, said means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line, each substation having a calling mechanism operative in response to manual operation thereof to transmit current for one digit of the called number and then come to rest before further manual operation for the next digit.

38. A party-line automatic telephone exchange system provided with centralized means for supplying battery current over the lines for both talking and operating purposes, having release mechanism, and with a high resistance at each substation on the party-line to prevent a release when one subscriber signals another on the same line.

39. In a telephone system a ring key, in combination with centralized means for supplying battery current over the lines for both talking and operating purposes, an automatic subscriber's line provided at the substation thereof with a high resistance coil normally short-circuited by the closed contacts of the ringing key.

40. In a telephone system a ringing key, an automatic subscriber's line, means for automatically extending connection therefrom by using the two sides thereof in series, centralized means for supplying battery current over the lines for both talking and operating purposes, and a resistance coil in the line at the substation thereof normally short-circuited by the closed contacts of the ringing key.

41. In a telephone system, subscribers' lines, means for automatically extending connection to a called line by using the two sides of the calling line in series, a slow-acting bridge-cut-off relay for each line, centralized means for supplying battery current over the lines for both talking and operating purposes, and a double-wound relay and a slow-acting relay for each trunk to which calling lines can be directly connected, as set forth.

42. In a telephone system, the combination of a partly-line having a plurality of substations thereon, each substation having a calling mechanism operative in response to manual operation thereof to transmit current for one digit of the called number and then come to rest before further manual operation for the next digit, means for automatically extending connection therefrom by using the two sides of the line in series, trunk-release circuits, centralized means for supplying battery current over the lines for both talking and operating purposes, means for initiating the release over the line circuits, said first means comprising a trunk selector individual to the calling line, trunk lines accessible to said selector, and means for said trunk selector responsive to perform the first trunking operation of the selector in response to the closure of both sides of the calling line in series to reject busy trunks and to select an idle trunk independent of any further action from the line.

43. In a telephone system, the combination of a party-line having a plurality of substations thereon, each sub-station having a calling mechanism operative in response to manual operation thereof to transmit current for one digit of the called number and then come to rest before further manual operation for the next digit, means for automatically extending connection therefrom by using the two sides of the calling line in series, trunk-release circuits provided with slow-acting release relays, centralized means for supplying battery current over the lines for both talking and operating purposes, and means for initiating the release over the line circuits.

44. A subscriber's telephone line, in combination with centralized means for supplying battery current over the lines in series for both talking and operating purposes, and provided with a slow-acting bridge-cut-off relay and a bridge normally closed through the contacts thereof.

45. A two-wire automatic telephone exchange system controlled over the two sides of the line, in combination with centralized means for supplying battery current over the lines in series for both talking and operating purposes, and provided with automatic means for locking on a busy line until the calling subscriber replaces his receiver without connecting the calling line therewith.

46. A two-wire automatic telephone exchange system including switches, operative in response to current corresponding to a plurality of digits of the called number over the two sides of the subscriber's line in series, provided with automatic means for locking on a busy line without connecting the calling line therewith, each sub-station having a calling mechanism operative in response to the manual operation thereof to transmit current for one digit of the called number, and then come to rest before further manual operation, for the next digit.

47. In an automatic telephone system, a switch for extending a talking circuit from a calling to a called line, means in said switch controlled over the two sides of the talking circuit in series for first electing the group of the called subscriber and for then locating the line of the called subscriber in the elected group, said switch provided also with electromagnetic means for preventing the extension of the talking circuit of the called line if the called line is busy, releasing mechanism for said switch, and means under the control of the talking circuit for releasing the switch after the busy line has been located.

48. In a telephone system, a party-line, and means controlled over the two sides of the line in series for selectively signaling on said line when one party calls another on the same line, comprising means for supplying ringing currents of different frequencies, and means controlled by the calling party over the two sides of the line in series for selecting the frequency necessary for signaling another party on the same line.

49. In a telephone system, a line, means for supplying ringing currents of different frequencies, a mechanism for selecting the different frequencies one at a time, and means for controlling said mechanism from a station on said line over the two sides of the line in series.

50. In a telephone system, a line, means for supplying different kinds of signaling current, a mechanism for selecting the different kinds of current one at a time, and means for controlling said mechanism from a station on said line over the two sides of the line in series.

51. In a telephone system, a party-line, mechanism for selectively signaling on said line, a trunk line, and means for controlling said mechanism from a station on said line over the two sides of the trunk line in series.

52. In a telephone system, a line, means for signaling on said line from a station on said line, means for interrupting the signaling current intermittently, and mechanism for disconnecting the signaling current when the called subscriber answers, said mechanism operative only during interruption of the ringing current.

53. In a telephone system, a party-line, means whereby one subscriber may call another on the same line, means for supplying signaling current to said line when one party calls another on the same line, and an interrupter at the central office for automatically interrupting the signaling current intermittently, while the conductors of the party-line are connected in series.

54. In a telephone system, a party-line, means whereby one subscriber may call another on the same line, means for supplying signaling current to said line when one party calls another on the same line, means for automatically interrupting the signaling current intermittently, and mechanism for disconnecting the signaling current when the called subscriber answers, dependent for its operation upon momentary interruption of the said current.

55. In a telephone system, a party-line, means controlled over the two sides of the line in series for selectively signaling on said line when one party calls another on the same line, comprising means for supplying ringing currents of different frequencies, means controlled by the calling party over the two sides of the line in series for selecting the frequency necessary for signaling another party on the same line, and automatic means for extending connection from said party-line.

56. In a telephone system, a line, means for supplying ringing currents of different frequencies, a mechanism for selecting the different frequencies one at a time, means for controlling said mechanism over the two sides of the line in series, and automatic step-by-step-controlled means for extending connection from said line.

57. In a telephone system, a line, means for supplying different kinds of signaling current, a mechanism for selecting the different kinds of current one at a time, means for controlling said mechanism over the two sides of the line in series, and automatic step-by-step-controlled means for extending connection from said line.

58. In a telephone system, a party-line, mechanism for selectively signaling on said line, a trunk line, means for controlling said mechanism over the two sides of the trunk line in series, and automatic step-by-step-controlled means for extending connection from said line.

59. In a telephone system, a party-line, means whereby one party may call another on the same line, means for supplying signaling current to said line when one party calls another on the same line, means at the central station for automatically interrupting the signaling current intermittently while the party line conductors are connected in series, and automatic means for extending connection from said party line.

60. In a telephone system, a party-line, means whereby one party may call another on the same line, means for supplying signaling current to said line when one party calls another on the same line, means for automatically interrupting the signaling current intermittently, mechanism for disconnecting the signaling current when the called subscriber answers, dependent for its operation upon momentary interruption of the said current, and automatic means for extending connection from said party-line.

61. In a telephone system, a line, substations on said line, a plurality of ringing current generators at the exchange, and means controlled by a calling subscriber over the two conductors of said line in series for selecting one of said generators and for connecting said line conductors to opposite poles thereof to signal a called subscriber.

62. In a telephone system, a line, substations on said line, a plurality of ringing current generators at the exchange, means controlled by a calling subscriber on said line for selecting one of said generators, a resistance at the calling substation with means for including it in the line circuit, and means responsive to such inclusion for connecting the selected generator to said line to signal a called subscriber thereon.

63. In a telephone system, a party line, means controlled by a calling subscriber on said line and including an automatic switch for completing two bridges of said line at the exchange, a source of ringing current in one bridge, and a battery and a relay in the other bridge, said relay energized over the line circuit to maintain said switch in operated position.

64. In a telephone system, a party line, means controlled by a calling subscriber on said line and including an automatic switch for completing two bridges of said line at the exchange, a source of ringing current in one bridge, a battery and a relay in the other bridge, said relay energized over the line circuit to maintain said switch in operated position, means for intermittently opening the ringing current bridge and for inserting a second relay in said battery bridge, and means controlled by said second relay for preventing another completion of the ringing current bridge.

65. In a telephone system, a party line, a plurality of ringing current generators at the exchange, means controlled by a calling subscriber on said line for selecting one of said generators, means for connecting the selected generator to said line to signal a called subscriber thereon, means controlled by the calling subscriber to close a circuit for operating said connecting means, and an intermittent interrupter in said circuit.

66. In a telephone system, a calling and a called line, a plurality of stations on the calling line, a calling device at each station adapted when actuated to produce a series of uniform interruptions in the line circuit, automatic switches at the exchange, a controlling relay in each switch, and means whereby the relays in a plurality of switches may be successively operated over the two sides of the calling line in series in response to series of interruptions produced by successive actuations of the calling device at one of said stations to control their associated switches to connect the said calling and called lines.

67. In a party line telephone system, the combination with a calling and a called line each having a plurality of connected stations, of connector switches and selective signaling mechanism cooperating therewith for connecting said lines and signaling any desired station on the called line, selector switches and a non-numerical trunking switch individual to the calling line for extending said line to one of said connectors, and a calling device at the calling station adapted to control the operation of said selector and connector switches by series of interruptions produced in the line circuit including the two sides of the calling line in series.

68. In a telephone system, a plurality of lines each having a plurality of connected substations, automatic switching mechanism at the exchange controllable over the two sides of a calling line in series for extending a connection to a called line, and selective signaling equipment at the exchange for signaling a wanted substation on a connected called line.

69. In a telephone exchange system, a party line, a temporarily established connection at the exchange comprising an extension of said line, two relay bridges across the extended line in series with a battery, said relays being energized over said line through a calling substation thereon, means for projecting ringing current over said line to signal a called substation, and means at the calling substation for increasing the resistance of the line circuit, the relay in one of said bridges being deenergized responsive thereto to operate said ringing means, and the relay in the other bridge being maintained energized to prevent the release of the connection.

70. In a telephone system, a plurality of lines each having a plurality of connected substations, automatic switching mechanisms at the exchange controllable over the two sides of a calling line in series for extending a connection to a called line, a test circuit for rendering the calling line busy closed upon the initiation of the call, and automatic means for momentarily opening said test circuit to permit one of said switching mechanism to connect with the calling line as a called line.

71. In a telephone system, a plurality of lines each having a plurality of connected substations, an automatic connector switch controllable by impulses delivered over the two sides of a calling line in series for completing a connection to a called line, a test circuit for rendering the called line busy closed upon the initiation of the call, and a relay responsive to one of said impulses for opening said test circuit to permit said connector switch to connect with the calling line as a called line.

72. In a telephone system, a party line, means whereby one subscriber may call another subscriber on the same line, means for supplying signaling current to said line when one party calls another on the same line, means for automatically interrupting the signaling current intermittently, and means controlled by the calling party on said line for disconnecting the signaling current therefrom, dependent for its operation upon the momentary interruption of said current.

73. In a telephone system, a party line, means whereby one party may call another on the same line, means for supplying signaling current to said line when one party calls another on the same line, means for automatically interrupting the signaling current intermittently, means controlled by the calling party on said line for disconnecting the signaling current therefrom, dependent for its operation upon the momentary interruption of said current, and automatic means for extending connection from said party line.

74. In a telephone system, a subscriber's line, an automatic connector switch, means controlled by one subscriber on said line for operating the said connector switch to seize said line, means controlled by said subscriber for then increasing the resistance in said line, and means controlled by said increase in resistance for automatically applying ringing current to said line to call a second subscriber thereon.

Signed by me at Chicago, Cook County, Illinois, this 5th day of Aug. 1918.

TALBOT G. MARTIN.